(12) United States Patent
Waldrop

(10) Patent No.: US 12,397,213 B1
(45) Date of Patent: Aug. 26, 2025

(54) SYSTEM FOR GAME OF SHAME FOR GOLF

(71) Applicant: Scott Waldrop, Gulf Shores, AL (US)

(72) Inventor: Scott Waldrop, Gulf Shores, AL (US)

( * ) Notice: Subject to any disclaimer, the term of this patent is extended or adjusted under 35 U.S.C. 154(b) by 124 days.

(21) Appl. No.: 18/103,223

(22) Filed: Jan. 30, 2023

(51) Int. Cl.
| A63B 67/02 | (2006.01) |
| A63B 55/60 | (2015.01) |
| A63B 57/30 | (2015.01) |
| B62D 47/00 | (2006.01) |

(52) U.S. Cl.
CPC ............. *A63B 67/02* (2013.01); *A63B 55/61* (2015.10); *A63B 57/30* (2015.10); *B62D 47/00* (2013.01)

(58) Field of Classification Search
CPC ... A63B 67/02; A63B 57/30; A63B 2055/602; B60Q 1/482
See application file for complete search history.

(56) References Cited

U.S. PATENT DOCUMENTS

| 1,410,402 A * | 3/1922 | Gray .................... G09F 3/16 40/659 |
| 1,552,729 A * | 9/1925 | Pipp ..................... G09F 1/10 40/658 |
| 1,704,562 A * | 3/1929 | Egan .................... G09F 3/20 40/658 |
| 2,546,855 A * | 3/1951 | Frame .................. B60R 13/00 248/539 |
| 5,387,010 A * | 2/1995 | Mohr .................... B42D 17/00 D34/27 |
| 5,540,181 A * | 7/1996 | Pearce .................. G09F 17/00 73/170.15 |
| 5,697,176 A | 12/1997 | Kuni, Jr. et al. |
| 5,983,518 A * | 11/1999 | Ellenburg ............ D06F 59/04 34/106 |
| 6,032,523 A * | 3/2000 | Smith .................. G01P 13/02 73/170.07 |
| 6,085,687 A * | 7/2000 | Chester ................ G09F 21/04 116/28 R |
| 6,367,181 B1 | 4/2002 | Skoog |
| 6,378,453 B1 * | 4/2002 | Conway ............... G09F 17/00 116/28 R |
| 6,584,927 B1 * | 7/2003 | Iversen ................ G09F 17/00 116/29 |

(Continued)

FOREIGN PATENT DOCUMENTS

WO   WO 2002099773   4/2002

*Primary Examiner* — Steven B Wong
(74) *Attorney, Agent, or Firm* — George L Williamson

(57) ABSTRACT

Method and apparatus for a game of shame to be played as part of a round of a game of conventional golf amongst members of a group of golfers. The game includes a shame indicator in the form of an article displayed by attachment onto a golf cart using a mechanical attachment means in response to a member of the golf group making an errant shot as he/she plays the game. The attachment means is a mechanical device having an upright standing arm portion upon which the article is actually attached for display and also includes a pair of flexible arms which are flexible in nature for use in attachment of the attachment means onto the edge of the roof of the golf cart. The mechanical attachment means has soft material attached to the ends of its bendable arms in order to protect the golf cart roof from scratches and also to add a gripping surface to the flexible arms so that they will more securely attach to the roof of the golf cart.

3 Claims, 3 Drawing Sheets

(56) References Cited

U.S. PATENT DOCUMENTS

| | | | | |
|---|---|---|---|---|
| 6,742,757 B2* | 6/2004 | Fox | ............... | F16M 13/022 |
| | | | | 248/538 |
| 7,066,105 B2* | 6/2006 | Tal | ............... | G09F 21/04 |
| | | | | 116/28 R |
| 7,207,129 B2 | 4/2007 | Buchanan et al. | | |
| 7,823,956 B2* | 11/2010 | Jones | ............... | B60J 7/10 |
| | | | | 296/100.06 |
| D672,264 S * | 12/2012 | Ochoa | ............... | D10/109.1 |
| 9,633,531 B1* | 4/2017 | Taylor | ............... | G08B 5/02 |
| 9,821,709 B1* | 11/2017 | Campbell | ............... | B60Q 1/48 |
| D844,533 S * | 4/2019 | Moon | ............... | D12/223 |
| 10,946,727 B2* | 3/2021 | Gulledge | ............... | B60J 5/0487 |
| 2004/0163458 A1* | 8/2004 | Lapkin | ............... | A63B 57/00 |
| | | | | 73/170.05 |
| 2006/0218831 A1* | 10/2006 | Rowe | ............... | G09F 21/04 |
| | | | | 40/442 |
| 2009/0229094 A1* | 9/2009 | Reese | ............... | B60J 1/06 |
| | | | | 296/96.2 |
| 2015/0232040 A1 | 8/2015 | Wirtjes | | |
| 2016/0151688 A1* | 6/2016 | Wark | ............... | A45C 13/023 |
| | | | | 224/274 |

* cited by examiner

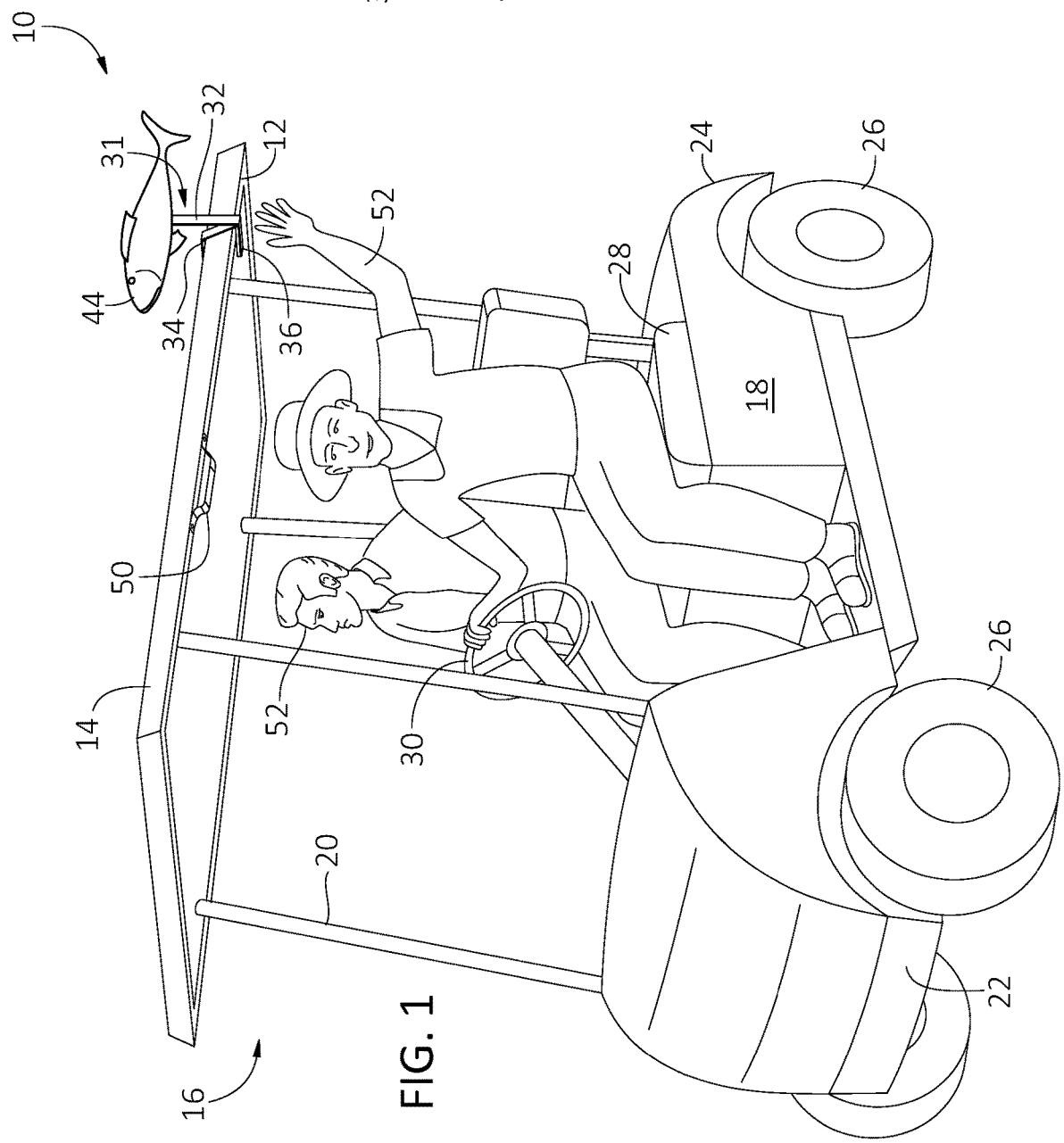

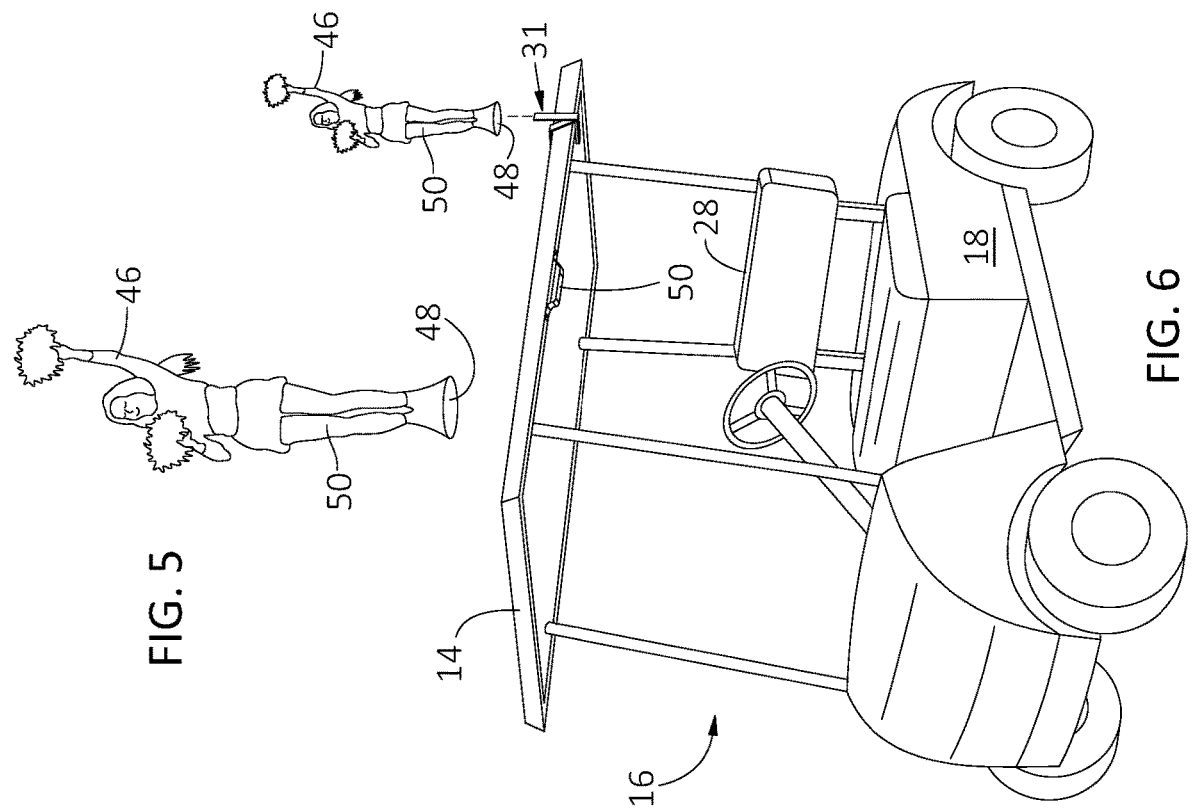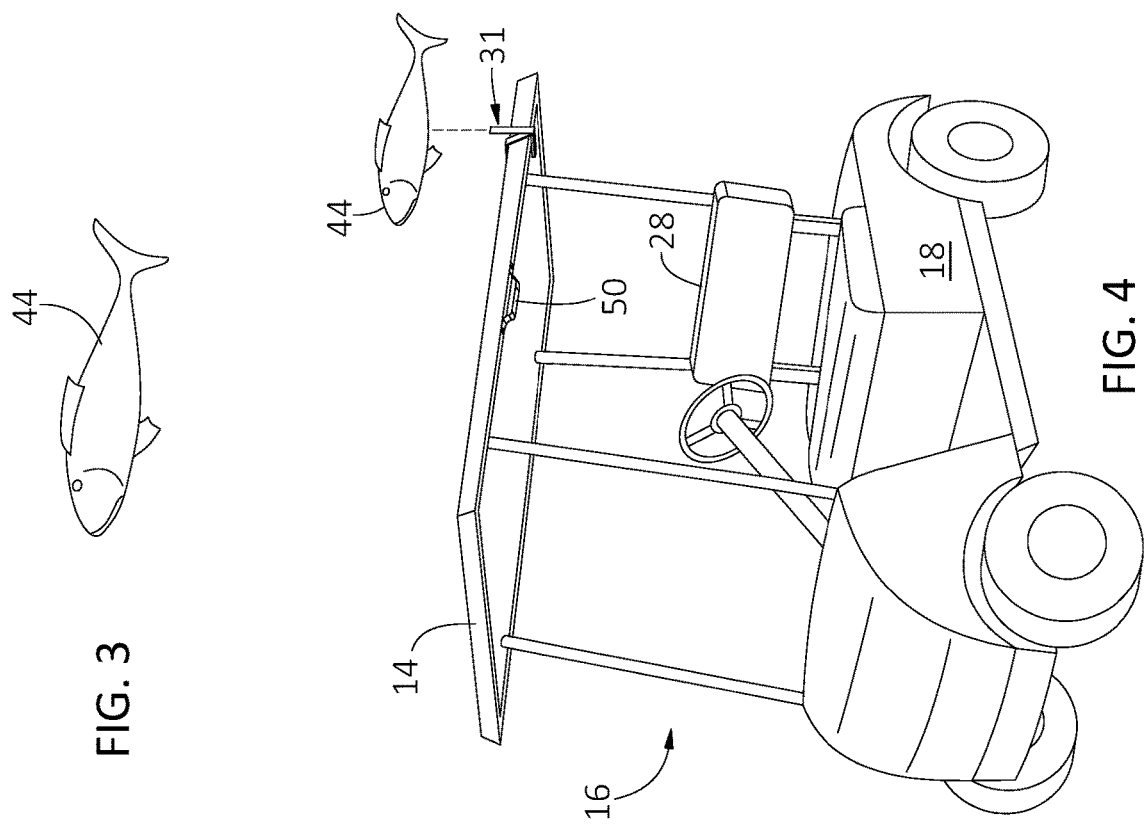

SYSTEM FOR GAME OF SHAME FOR GOLF

BACKGROUND OF THE INVENTION

Field of the Invention

The present invention relates generally to games and more particularly, is concerned with a game of shame for use with a conventional game of golf.

Description of the Related Art

Devices relevant to the present invention have been described in the related art; however, none of the related art devices disclose the unique features of the present invention. In U.S. Patent Application Publication No. 2015/0232040 dated Aug. 20, 2015, Wirtjes disclosed a golf cart towel hook. In U.S. Patent Application Publication No. 2016/0151688 dated Jun. 2, 2016, Wark disclosed a golf cart accessory. In U.S. Pat. No. 6,584,927 dated Jul. 1, 2003. Iversen, et al, disclosed a golf cart signal flag system. In U.S. Pat. No. 7,207,129 dated Jan. 24, 2007, Buchanan, et al., disclosed a golf cart mounted display panel. In U.S. Pat. No. 5,697,176 dated Dec. 16, 1997, Kuni, Jr., et al., disclosed a golf cart display panel. In U.S. Pat. No. 6,367,181 dated Apr. 9, 2002, Skoog, disclosed a golf ad. In International Patent Application Publication No. WO2002099773 dated Apr. 31, 2002, McGregor, et al., disclosed an apparatus and method for advertising on a golf cart.

While these devices may be suitable for the purposes for which they were designed, they would not be as suitable for the purposes of the present invention as hereinafter described. As will be shown by way of explanation and drawings, the present invention works in a novel manner and differently from the related art.

SUMMARY OF THE PRESENT INVENTION

The present invention discloses a game of shame to be played as a part of a round of conventional golf amongst members of a group of golfers. The game of shame of the present invention includes a shame indicator which includes a display of an article onto the golf cart of the group of golfers playing the game wherein an article is displayed by attachment onto a golf cart using a mechanical attachment means in response to a member of the golf group making an errant shot as he/she plays the game. The attachment means of the present invention is a mechanical device having an upright standing arm portion upon which the article is actually attached for display and also includes a pair of flexible arms which are elastic in nature for use in attachment of the attachment means onto the edge of the roof of the golf cart. The mechanical attachment means has soft material attached to the ends of its bendable arms in order to protect the golf cart roof from being scratched and also to add a gripping surface to the flexible arms so that they will more securely attach to the roof of the golf cart. The angle between the flexible arms will substantially match the angle of the edge of the roof of the golf cart so that the roof clip can be securely attached to the edge of the roof of the golf cart. A shame indicator includes characters which are attached to the upright member of the roof clip by insertion over the free end of the upstanding portion of the roof clip or mating hook and loop material may be placed on the character and the upstanding portion of the roof clip so that the character can be secured to the roof clip.

An object of the present invention is to provide a fun game of shame to be played within a round of conventional golf amongst friends. A further object of the present invention is to display a character on the roof or other portion of the golf cart whenever a member of the group of golfers playing a round of golf makes an errant shot. A further object of the present invention is to display characters or articles of various types in response to various types of errant shots to show other golfers that a member of the golf group has made a certain type of errant shot. A further object of the present invention is to provide a game of shame which can be easily used by a golfer. A further object of the present invention is to provide a game of shame for use by golfers which can be relatively easily and inexpensively manufactured.

The foregoing and other objects and advantages will appear from the description to follow. In the description, reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a descriptive view of a golf cart showing the present invention in operative connection.

FIG. 2 is a perspective view of the roof clip of the present invention.

FIG. 3 is an exploded perspective view of the present invention showing a shame indicator being attached to the roof clip of the present invention.

FIG. 4 is a perspective view perspective view of a shame indicator for use with the present invention.

FIG. 5 is an exploded perspective view of the present invention showing a shame indicator being attached to the roof clip of the present invention.

FIG. 6 is a perspective view of a shame indicator for use with the present invention.

LIST OF REFERENCE NUMERALS

Figure 7:
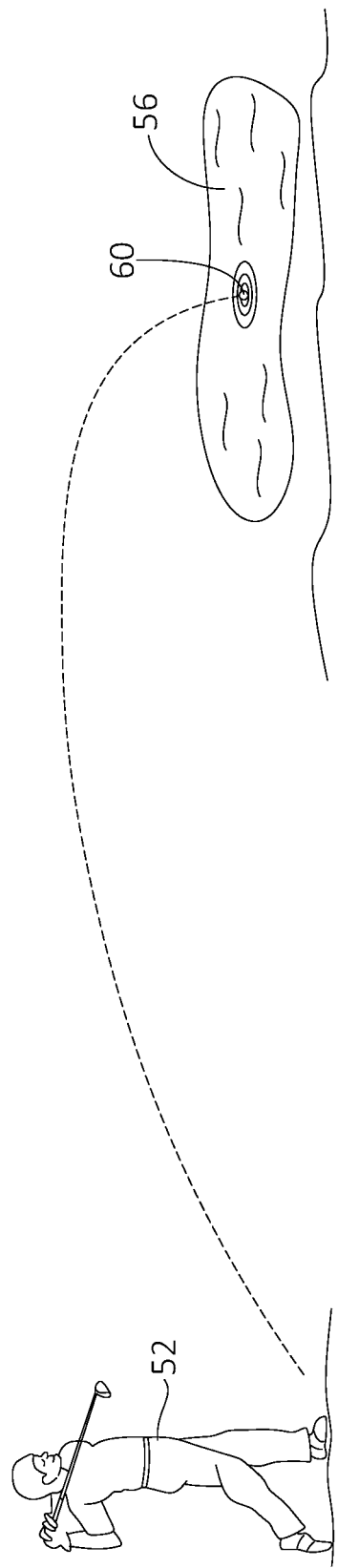
FIG. 7 is a perspective view of a golfer hitting a golf ball into a pond on a golf course.

With regard to reference numerals used, the following numbering is used throughout the drawings.

10 present invention
12 edge of roof
14 roof of golf cart
16 golf cart
18 chassis of golf cart
20 support poles for roof
22 front end
24 rear end 26 wheels
28 sea
30 steering wheel
31 roof clip
32 upstanding portion
34 first flexible arm
36 second flexible arm
38 first cushion
40 second cushion
42 free end
44 fish article
46 cheerleader article
48 bore
50 roof handle
52 player
54 common base
56 pond
58 hangman's knot
60 golf ball

DETAILED DESCRIPTION OF THE
PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 8 illustrate the present invention wherein a system for a game of shame to be played as part of a conventional golf game is disclosed and which is generally indicated by reference number 10.

Turning to FIG. 1, therein is illustrated the present invention 10 which is a system for a game of shame which includes a shame indicator in the form of an article 44 simulating a fish 44 attached onto the edge 12 of the flat roof 14 of a conventional golf cart 16 using a roof clip 31. The roof 14 is supported above the chassis 18 of the golf cart 16 using a plurality of upstanding support poles 20. The golf cart 16 has a chassis 18 including a front end 22 and rear end 24 supported by a plurality of ground contacting wheels 26 and also has a seat 28 upon which the players 52 can sit along with a steering wheel 30. The roof clip 31 is attached onto an outer edge 12 of the roof 14 so that the roof clip 31 is easily visible to other golfers who might observe the grouping of golfers playing the game of golf as part of the present invention 10. The roof clip 31 has an upstanding portion 32 along with a flexible first arm 34 and a flexible second arm 36 which are both flexible in nature and which securely attach the roof clip 31 onto the edge 12 of the roof 14 of the golf cart 16. A shame indicator in the form of a fish 44 is attached onto the upstanding portion 32 wherein the fish is a general indication that a member of the golf group has hit an errant shot into a water hazard as illustrated in FIG. 7. Of course, other types or forms of shame indicators could be substituted for the fish 44 that could also be used to indicate an errant shot related to a water hazard without departing from the teachings of the present invention 10.

Turning to FIG. 2, therein is shown the roof clip 31 having an upstanding portion 32 along with a first flexible arm 34 and a second flexible arm 36 being biased toward each other for gripping the roof 14 wherein each flexible arm 34, 36 has a corresponding cushion portion 38, 40 near its free end wherein the cushion or padded portion is expected to be made of softer material, such as rubber, in order to assist in affixing the roof clip 31 to the roof 14 of the golf cart 16 and also to prevent the arms 34, 36 from scratching or otherwise damaging the roof 14 of the golf cart 16. Note that the upstanding portion 32 of the roof clip 31 has a free end 42 thereon to which the character or article used as a shame indicator with the present invention can be easily and conveniently attached to the roof clip 31. Roof clip 31 is expected to be made of either light flexible metal or plastic like material or the like with arms 32, 34, 36 being joined at a common base 54 so that arms 32, 34, and 36 share a common base which base acts as a pivot point about which the arms flex.

Turning to FIGS. 3 and 5, therein are shown an exemplary character or article to be used as shame indicator as a part of the game of shame of the present invention 10. FIG. 3 illustrates a toy-like fish 44 and FIG. 5 illustrates a cheerleader 46. The articles 44, 46 may have a pouch or like on its body for insertion over the upstanding portion 32 of the roof clip 31 wherein the article 46, shown in FIG. 5, is made in the nature of a sleeve 50 containing an internal bore 48 so that the upstanding portion 32 of roof clip 31 can be inserted into the bore 48 of the article 46 for easy attachment thereto. Any of the shame indicators disclosed in this specification could be made with a bore 48 or could be designed otherwise to mount on the upstanding portion 32 of roof clip 31 or to mount on other portions of the golf cart 16.

Turning to FIG. 4, therein is shown an exploded view wherein the toy-like fish 44 is being attached to the roof clip 31 and onto the roof 14 of the golf cart 16 so that the article 44 can be easily seen by other golfers.

Turning to FIG. 6, therein is shown an exploded view wherein the character 46 is being attached to the roof clip 31 onto the roof 14 of the golf cart 16 so that the article 46 can be easily seen by other golfers.

Turning to FIG. 7, therein is shown a golfer 52 hitting an errant golf shot wherein the ball 60 travels into a water hazard 56, i.e., a pond, as part of a round of golf amongst friends in a golf group.

Figure 8:
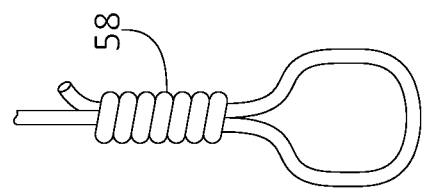
FIG. 8 is a perspective view of a shame indicator for use with the present invention.

Turning to FIG. 8, therein is shown a shame indicator in the form of a hangman's knot 58 which is an alternative design calculated to indicate a poor golf shot.

By way of general explanation of the game of shame as taught by the present invention 10 and by reference to FIGS. 1-8, the present invention 10 is intended to be played as a game of shame within a conventional golf game as might be played amongst a grouping of friends. Whenever one of the golfers makes an errant shot (as shown for example in FIG. 7) he/she is awarded by having a shame indicator in the form of an animal character or other article correlating as closely as possible to the type of foul or errant shot committed by the golfer to be attached to the roof 14 of the golf cart 16 being used by the group of golfers. For example, if one of the golfers hits an errant shot into the water or pond (See FIG. 7) a fish 44 might be attached to the roof 14 of the golf cart 16. Alternatively, if the golfer hits a poor shot that doesn't make it past a certain tee box, a shame indicator such as an article in the nature of a cheerleader or doll 46 could be attached to the roof 14 of the golf cart 16. The shame indicator to be attached to the golf cart roof 14 may consist of some sort of article that is clearly visible to other golfers and, for example, might hang down below the roof 14 of the golf cart 16 so as to accomplish the purpose of shaming or making fun of the golfer who has been awarded the shame indicator for making the errant shot. Also, the shame indicator might be displayed on the side of the golf cart 16 closest to the golfer who made the errant shot. The shame indicator might be displayed onto the roof 14 of the golf cart 16 or onto the roof handles 50 of the golf cart or onto the metal roof supports 20 or any other suitable locations on the golf cart 16.

In this respect, each of the shame indicators to be displayed would be indicative of a particular type of errant shot made by the golfer within the group of friends playing in the golf group. The shame indicators could be distinctively marked with indicia such as by color and/or by a unique design so that they would be indicative of a particular type of errant shot which was made by the golfer. For example, a fish 44 might be attached to the roof lip 31 if the errant shot included hitting the ball into the water or other types of articles as previously discussed above. Thus, any number of shame indicators 44, 46 could be raised singly or in various combinations to produce a desired type of shame indicating a particular type of errant shot. When the player who made the errant shot has produced a desired shot, the corresponding shame indicator could be lowered or removed from the golf cart until another errant shot was made by someone else within the golf group.

The angle between the flexible arms 34, 36 will substantially match the angle of the edge of the roof 12 of the golf cart 16 so that the roof clip 31 can be securely attached to the edge of the roof of the golf cart. A shame indicator includes characters/articles which are attached to the upright member of the roof clip 31 by insertion over the free end of the upstanding portion 32 of the roof clip 31 or mating hook and loop material may be placed on the character and the upstanding portion of the roof clip so that the character can be secured to the roof clip.

The limited number of shame indicators illustrated herein this specification are merely exemplary in nature and one skilled in the art would understand that there are many other articles which could serve as shame indicators as limited only by the imagination of the golfers playing the shame game of the present invention 10 without departing from the scope and teachings of the present invention 10. For example, other suitable shame indicators might include any type of stuffed animal or toy, action figure, or piece of material suggesting or correlating to the errant shot that could be removably or temporarily affixed to the golf cart and hanging down a short distance which would be noticeable by a fellow golfer.

Lines with arrowheads are sometimes placed on drawings to indicate potential motion or direction of movement of an item illustrated in the drawing.

I claim:

1. A system for a shame game for being played between a group of golfers, comprising:
   a) a shame indicator for being attached to at least one golf cart being used by the group of golfers;
   b) wherein said shame indicator forms a mental association to another golfer of a particular type of an errant shot made by a member of the group of golfers;
   c) a roof clip, said roof clip further comprising a first upstanding arm and a first and second flexible arm, each said arm being joined at a first end to form a common base, wherein said common base acts as a pivot point for said first and second flexible arms, each said arm having an opposing free end, said first and second flexible arms being biased toward each other so that an edge of a roof of said at least one golf cart is removably attached thereinbetween, wherein said shame indicator is removably attached to said free end of said first upstanding arm, wherein the first and second flexible arms are joined together such that an angle between said first and second flexible arms substantially matches an angle of said edge of said roof of said at least one golf cart so that said first and second flexible arms are removably attached to said at least one golf cart; and
   d) wherein when said member of the group of golfers makes said errant shot said shame indicator is displayed on said roof clip so that said other golfers are aware of said errant shot.

2. The system of claim 1, wherein said shame indicator has a bore therein wherein said free end of said first upstanding arm of said roof clip is inserted into said bore.

3. The system of claim 1, wherein said shame indicator is selected from the group consisting of a fish, a cheerleader, or a hangman's knot.

* * * * *